(12) United States Patent
Wang et al.

(10) Patent No.: US 10,964,038 B2
(45) Date of Patent: Mar. 30, 2021

(54) METHOD AND APPARATUS FOR MAPPING THREE-DIMENSIONAL POINT CLOUD DATA, AND STORAGE MEDIUM

(71) Applicant: BAIDU ONLINE NETWORK TECHNOLOGY (BEIJING) CO., LTD., Beijing (CN)

(72) Inventors: Yucheng Wang, Beijing (CN); Liang Wang, Beijing (CN)

(73) Assignee: Baidu Online Network Technology (Beijing) Co. Ltd., Beijing (CN)

( * ) Notice: Subject to any disclaimer, the term of this patent is extended or adjusted under 35 U.S.C. 154(b) by 68 days.

(21) Appl. No.: 16/560,443

(22) Filed: Sep. 4, 2019

(65) Prior Publication Data
US 2020/0082554 A1  Mar. 12, 2020

(30) Foreign Application Priority Data

Sep. 6, 2018  (CN) .......................... 201811037048.4

(51) Int. Cl.
| | | |
|---|---|---|
| *G06T 7/521* | (2017.01) | |
| *G06T 3/40* | (2006.01) | |
| *G06T 5/20* | (2006.01) | |
| *G06T 7/50* | (2017.01) | |

(52) U.S. Cl.
CPC .............. *G06T 7/521* (2017.01); *G06T 3/403* (2013.01); *G06T 3/4007* (2013.01); *G06T 7/50* (2017.01); *G06T 5/20* (2013.01); *G06T 2207/10028* (2013.01); *G06T 2207/20028* (2013.01)

(58) Field of Classification Search
CPC ......... G06T 3/4007; G06T 3/403; G06T 5/20; G06T 7/521; G06T 2207/10028; G06T 2207/20028
See application file for complete search history.

(56) References Cited

U.S. PATENT DOCUMENTS

| | | | |
|---|---|---|---|
| 2017/0272724 A1 | 9/2017 | Lim | |
| 2019/0271767 A1* | 9/2019 | Keilaf | ................. G01S 7/4863 |
| 2019/0311486 A1* | 10/2019 | Phan | ..................... G06T 5/005 |

FOREIGN PATENT DOCUMENTS

CN          110298811 A  * 10/2019

OTHER PUBLICATIONS

Extended European Search Report for EP Application No. 19193694.7, dated Feb. 10, 2020, 9 pages.

* cited by examiner

*Primary Examiner* — Justin P. Misleh
(74) *Attorney, Agent, or Firm* — Fay Sharpe LLP

(57) ABSTRACT

The embodiments of the present disclosure provide a method for processing 3D data, an apparatus for processing 3D data, a device and a storage medium. The method includes: acquiring three-dimensional point cloud data to be processed; mapping the three-dimensional point cloud data into a two-dimensional image space to obtain a first depth map; performing an expansion processing on the first depth map after changing an occlusion relation between target objects contained in the first depth map; and changing the occlusion relation between the target objects contained in the first depth map subject to the expansion processing to obtain a second depth map matched to the three-dimensional point cloud data.

17 Claims, 3 Drawing Sheets

METHOD AND APPARATUS FOR MAPPING THREE-DIMENSIONAL POINT CLOUD DATA, AND STORAGE MEDIUM

This application is based on and claims priority of Chinese Patent Application 201811037048.4, filed on Sep. 6, 2018, the entire contents of which are incorporated herein by reference.

FIELD

The present disclosure relates to three-dimensional data processing, more particularly to a method for processing three-dimensional data, an apparatus for processing three-dimensional data, a device and a storage medium.

BACKGROUND

Three-dimensional (3D) laser scanning technology is also called as real replication technology, which involves a technology revolution after GPS technology in the surveying and mapping engineering field. The 3D laser scanning technology transcends a conversional single-point measurement method, having an advantage of high effectiveness and accuracy. The 3D laser scanning technology may provide 3D point cloud data on a surface of an object to be scanned, such that it can be used to obtain a digital terrain model having a high accuracy and resolution.

A 3D laser scanner for realizing the 3D laser scanning technology is widely applied in road measurement and detection (tracking, road surface, road deformation), road maintenance and reconnaissance, building of road geometric model (transverse and longitudinal cross-section analysis), structure analysis (overpass), flood assessment analysis, overlay analysis in a geographic information system, traffic analysis, pilot vision and safety analysis and other fields.

In a process that the inventor finds the invention, the inventor recognizes that a conversional technology has the following defect: the 3D point cloud data obtained by one or a few 3D laser scanner has a low accuracy, such that the form and position of the measured object can not be produced completely and accurately.

DISCLOSURE

Accordingly, embodiments of the present disclosure provide a method for processing three-dimensional (3D) data, an apparatus for processing 3D data, a device and a storage medium, so as to optimize a conversional method for processing 3D data, such that an accuracy of 3D point cloud data is improved.

In a first aspect, embodiments of the present disclosure provide a method for processing 3D data, including: acquiring three-dimensional point cloud data to be processed; mapping the three-dimensional point cloud data into a two-dimensional image space to obtain a first depth map; performing an expansion processing on the first depth map after changing an occlusion relation between target objects contained in the first depth map; and changing the occlusion relation between the target objects contained in the first depth map subject to the expansion processing to obtain a second depth map matched to the three-dimensional point cloud data.

In a second aspect, embodiments of the present disclosure provide an apparatus for processing 3D data, including: a data acquiring module, configured to acquire three-dimensional point cloud data to be processed; a first depth map acquiring module, configured to map the three-dimensional point cloud data into a two-dimensional image space to obtain a first depth map; an expansion processing module, configured to perform an expansion processing on the first depth map after changing an occlusion relation between target objects contained in the first depth map; and a second depth map acquiring module, configured to change the occlusion relation between the target objects contained in the first depth map subject to the expansion processing to obtain a second depth map matched to the three-dimensional point cloud data.

In a third aspect, embodiments of the present disclosure provide a device, including one or more processors and a memory for storing one or more programs. When the one or more programs are executed by the one or more processors, the one or more processors are caused to perform the method for processing three-dimensional data of any embodiment of the present disclosure.

In a fourth aspect, embodiments of the present disclosure provide a storage medium containing instructions executable by a computer. When the instructions are executed by a processor of the computer, the method for processing three-dimensional data according to any embodiment of the present disclosure is performed.

The embodiments of the present disclosure provide a method for processing 3D data, an apparatus for processing 3D data, a device and a storage medium. By changing the occlusion relation between the target objects in a sparse depth map obtained by mapping the 3D point cloud data into the 2D image space, and performing the expansion processing on the sparse depth map to obtain a dense depth map matched to the 3D point cloud data, the problem that it is difficult to completely and accurately show the form and position of a measured object due to the low accuracy of the 3D point cloud data obtained by one or a few 3D laser scanners can be solved and the amount of 3D point cloud data can be increased reasonably and effectively, such that an accuracy of the 3D point cloud data is improved and the form and position of the measured object can be showed more completely and accurately.

EMBODIMENTS OF THE PRESENT DISCLOSURE

Figure 1:
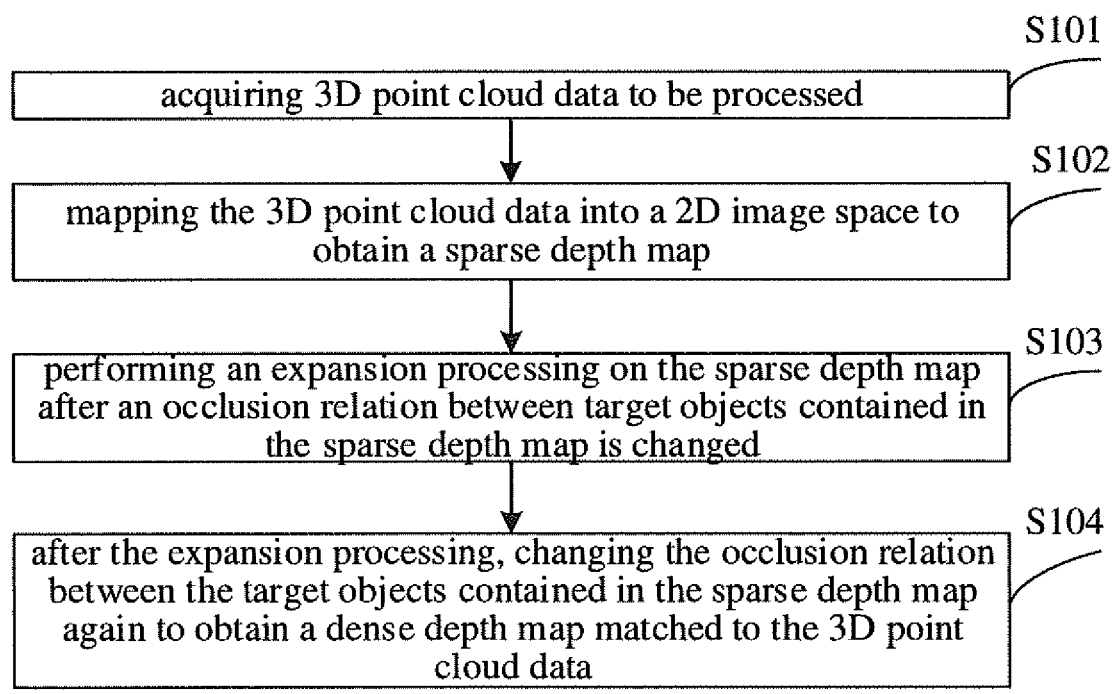
FIG. 1 is a flow chart of a method for processing 3D data according to a first embodiment of the present disclosure.

For a clear description of objectives, technical solutions and advantageous of the present disclosure, reference will be made in detail to describe embodiments of the present disclosure. It should be noted that, the embodiments described herein with reference to drawings are used to generally explain the present disclosure, rather than limiting the present disclosure.

In addition, it should also be noted that, for convenience of the description, the accompany drawings illustrate parts rather than all contents relative to the present disclosure. Before the exemplary embodiments are described in detail, it should be noted that some exemplary embodiments are described as processing or method in a form of a flow chart. Although the operations (or steps) illustrated in the flow chart are described as a processing in a certain order, some operations can be performed concurrently, concomitantly or simultaneously. In addition, the order of the operations may be re-arranged. When the operations have been accomplished, the processing may be finished. Additional steps or acts which are not illustrated in the drawings may be included. The processing may correspond to a method, a function, a regulation, a subroutine, a subprogram and the like.

First Embodiment

FIG. 1 is a flow chart of a method for processing 3D data according to the first embodiment of the present disclosure. The method in this embodiment can be performed by an apparatus for processing 3D data. The apparatus may be implemented by hardware and/or software, and integrated in a 3D data measurement device, for example vehicle-mounted or ship-mounted laser radar or the like. The method may include the following steps.

At block S101, 3D point cloud data to be processed is acquired.

In this embodiment, the 3D point cloud data to be processed may be data obtained by scanning a scene with a 3D laser scanner.

It should be understood that since the 3D laser scanner is expensive, it is generally impossible to configure a lot of 3D laser scanners in one 3D data measurement device, but only one 3D laser scanner is provided. It should be further understood that for a scene containing complicated content, several 3D laser scanners are required to accurately and completely obtain the 3D point cloud data corresponding to the scene. In fact, sometimes, the 3D point cloud data is not accurate and complete enough to accurately show the scene. However, with the method for processing the 3D data, i.e., steps 101-104, the accuracy and completeness of the 3D point cloud data can be improved.

At block S102, the 3D point cloud data is mapped into a 2D image space to obtain a sparse depth map.

In this embodiment, the 2D image space refers to an image space constructed with 2D images each having depth information.

In this embodiment, mapping the 3D point cloud data into the 2D image space can be implemented as follows. Based on a predetermined coordinate transformation rule, a plane coordinate of each data in the 3D point cloud data is transformed into a pixel coordinate in a predetermined 2D image, at the same time a depth coordinate of the data in the 3D point cloud data is configured as a depth value of the corresponding pixel coordinate.

The predetermined 2D image may be a regular image (for example, a square with 100*100 pixels, a rectangle with 500*300 pixels or the like) or an irregular image, which is not limited herein. Regardless of whether the 2D image is regular, it should make sure that all the 3D point cloud data can be effectively mapped into the predetermined 2D image and that all the pixels added during the expansion processing effectively fall into the 2D image.

It should be further understood that a plane position of each data in the 3D point cloud data may be discontinuous or discrete, the 3D point cloud data is merely used to represent the form and position of each object in a current scene, while no 3D point cloud data corresponds to background of the current scene. After the 3D point cloud data is mapped into the 2D image space, not all pixels in the 2D image space have depth values and positions of the pixels having the depth values may be discontinuous or discrete. Therefore, the image obtained after mapping the 3D point cloud data into the 2D image space is a 3D image constructed with the sparse 2D image having the depth information, in this embodiment, the 3D image is called as "sparse depth map".

At block S103, an expansion processing is performed on the sparse depth map after an occlusion relation between target objects contained in the sparse depth map is changed.

The expansion processing may be implemented as follows. A convolution operation is performed on the basis of a structure element X and a target object O (the target object O is consisted of pixels having the same depth value and similar positions in the sparse depth map) determined with the depth value of the structure element in the sparse depth map. If there is overlap between the structure element X and the target object O during a process of moving the structure element X, then a position where the structure element X overlaps with the target object is recorded, and a set of the positions where the structure element X overlaps with the target object refers to an expansion result of the target object O using the structure element X. Accordingly, a point at each position included the set of positions may be used to determine the depth value of the target object O correspondingly, so as to enlarge the set of points containing the depth value and corresponding to the target object O in the sparse depth map.

It should be understood that when the expansion processing is performed on the image having the depth value, if a position of a pixel A added during the expansion processing coincides with a position of a pixel B having the depth value that exists before the expansion processing (or of a pixel C added during the expansion processing) and the depth value of the pixel B (or of the pixel C) is less than that of the pixel A, then there may be a case that the pixel B is replaced by the pixel A (or the pixel A covers the pixel C), which causes a case that a back object may shield a front object in the image subject to the expansion processing.

Therefore, in this embodiment, before the expansion processing on the sparse depth map, the occlusion relation between the target objects included in the sparse depth map is changed, i.e., the positions of the target objects are reversed by changing the depth values of pixels, in this way, the case that the back object may shield the front object in the sparse depth map after the expansion processing can be avoided.

The method of changing the depth values of pixels is not limited in this embodiment, but the method of changing the depth values of pixels should satisfy the followings: first, the reverse of positions of the target objects may accurately realized after changing the depth values of pixels; second, there is an inverse method of the method, and the positions of the target objects may recover through the inverse method.

At block S104, after the expansion processing, the occlusion relation between the target objects contained in the sparse depth map is changed again to obtain a dense depth map matched to the 3D point cloud data.

In this embodiment, after the expansion processing, the occlusion relation between the target objects needs to be recovered, thus it is required to change the occlusion relation between the target objects contained in the sparse depth map again, i.e., reversing the positions of the target objects again, and the dense depth map matched to the 3D point cloud data may obtained after this change.

The embodiment of the present disclosure provides a method for processing 3D data. By changing the occlusion relation between the target objects in a sparse depth map obtained by mapping the 3D point cloud data into the 2D image space, and performing the expansion processing on the sparse depth map to obtain a dense depth map matched to the 3D point cloud data, the problem that it is difficult to completely and accurately show the form and position of a measured object due to the low accuracy of the 3D point cloud data obtained by one or a few 3D laser scanners can be solved and the amount of 3D point cloud data can be increased reasonably and effectively, such that an accuracy of the 3D point cloud data is improved and the form and position of the measured object can be showed by the 3D point cloud data more completely and accurately.

Second Embodiment

Figure 2:
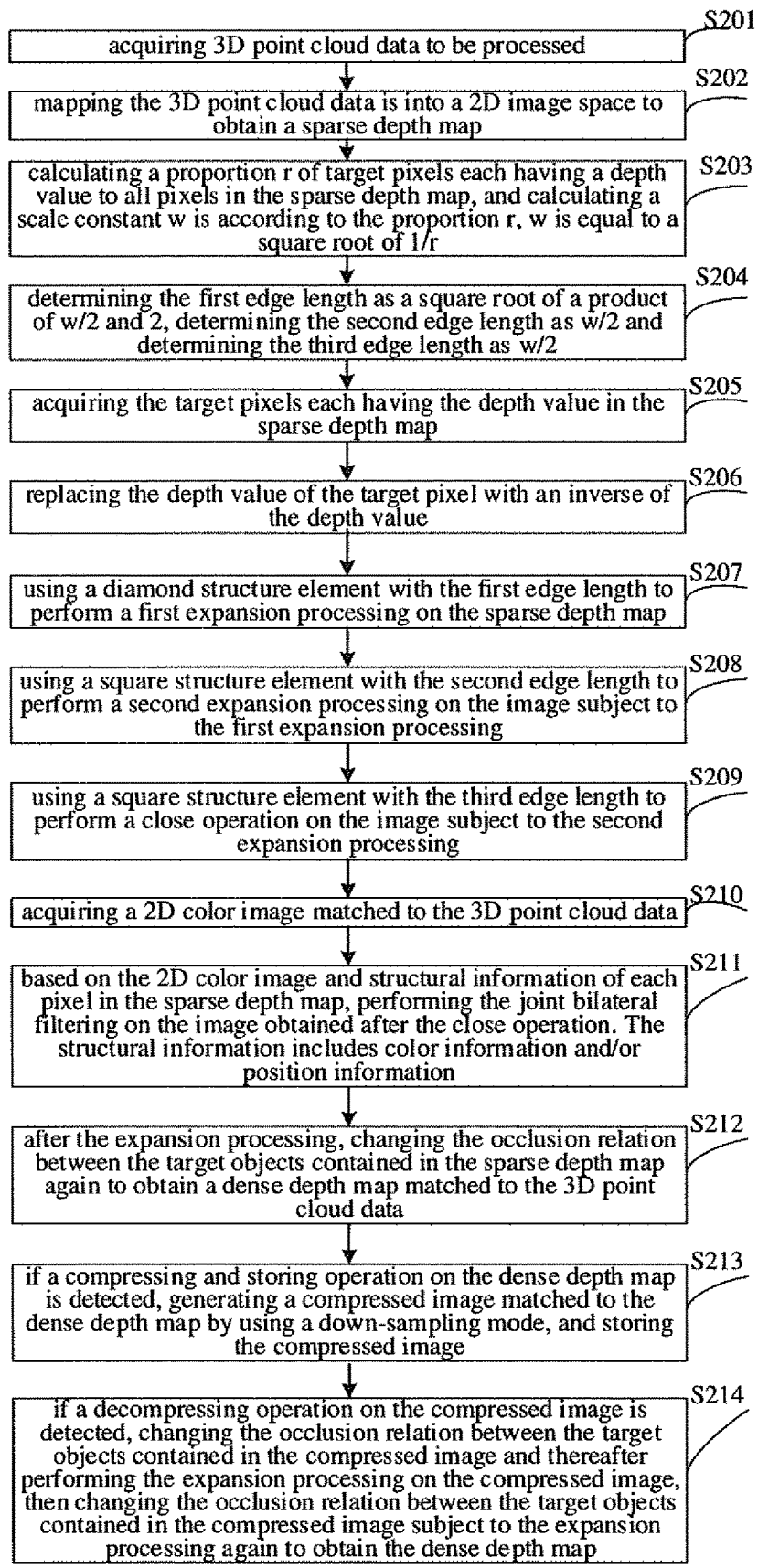
FIG. 2 is a flow chart of a method for processing 3D data according to a second embodiment of the present disclosure.

FIG. 2 is a flow chart of a method for processing 3D data according to the second embodiment of the present disclosure. The first embodiment is optimized to obtain the second embodiment. In the second embodiment, a method of changing the occlusion relation of target objects and the expansion processing is embodied, a step of implementing a close operation, a step of calculating an edge length of the structure element, a step of implementing a joint bilateral filtering and a step of implementing an image compression and decompression are added.

Accordingly, the method includes followings.

At block S201, 3D point cloud data to be processed is acquired.

At block S202, the 3D point cloud data is mapped into a 2D image space to obtain a sparse depth map.

At block S203, a proportion r of target pixels each having a depth value to all pixels in the sparse depth map is calculated, and a scale constant w is calculated according to the proportion r, where $$w = \sqrt{\frac{1}{r}}.$$

In this embodiment, the scale constant w is set, which is configured as a reference value of the edge length of the structure element used for the expansion processing. The scale constant w is equal to $$\sqrt{\frac{1}{r}},$$

where r refers to the proportion of the target pixels each having the depth value to all the pixels in the sparse depth map. The scale constant w is inversely proportional to r, which means that the more the target pixels contained in the sparse depth map, the fewer the pixels required to be subject to the expansion processing.

At block S204, a first edge length is determined as $$\frac{\sqrt{2}}{2}w,$$

a second edge length is determined as ½ w, and a third edge length is determined as ½ w.

It should be understood that when the structure element used for the expansion processing is a subrounded structure element, each edge in the image obtained after the expansion processing is smooth.

In this embodiment, by using a diamond structure element and a square structure element to implement two expansion processings (in steps at block S207 and block S208), an effect of a single expansion processing implemented with the subrounded structure element may realized.

In order to realize the above effect, in this embodiment, the edge length (i.e., the first edge length) of the diamond structure element is configured as $$\frac{\sqrt{2}}{2}w,$$

and the edge length (i.e., the second edge length) of the square structure element is configured as ½ w.

Further, in this embodiment, after two expansion processings, the close operation is performed on the image obtained after these two expansion processings. The structure element used in the close operation is the square structure element and the edge length of the square structure element is configured as ½ w.

At block S205, the target pixels each having the depth value in the sparse depth map are acquired.

It should be noted that the steps at block S205 and S206 can be executed after the steps at block S203 and block S204, or be executed before the steps at block S203 and S204, or be executed simultaneously with the steps at block S203 and S204.

In this embodiment, the occlusion relation between the target objects contained in the sparse depth map can be changed through the steps at block S205 and S206. The target pixel refers to a pixel having a depth value in the sparse depth map.

At block S206, the depth value of the target pixel is replaced with an inverse of the depth value.

In this embodiment, the changing of the occlusion relation between the target objects is implemented by replacing the depth value of the target pixel with the inverse of the depth value, in this way, the positions of the target objects can be reversed simply and effectively.

At block S207, a diamond structure element with the first edge length is used to perform a first expansion processing on the sparse depth map.

At block S208, a square structure element with the second edge length is used to perform a second expansion processing on the image subject to the first expansion processing.

At block S209, a square structure element with the third edge length is used to perform a close operation on the image subject to the second expansion processing.

Performing the close operation refers to performing expansion processing firstly and performing erosion processing thereafter. The close operation may be used to fill small cavities of an object, connect with an adjacent object and smooth the edge.

At block S210, a 2D color image matched to the 3D point cloud data is acquired.

In this embodiment, in order to smooth each edge of the image subject to the expansion processing and the close operation, the joint bilateral filtering is performed on the image after the close operation through steps at block S210 and block 211.

It should be understood that since the sparse depth map that needs to be subject to the expansion processing is obtained by mapping the 3D point cloud data, an effect of filtering may be optimized by performing the joint bilateral filtering on the image obtained after the close operation using a realistic image corresponding to the 3D point cloud data. Therefore, in this embodiment, the 2D color image matched to the 3D point cloud data is acquired to implement the joint bilateral filtering.

The bilateral filtering is implemented by optimizing Gaussian filtering with introducing a chromaticity difference. The two-dimensional feature difference of both the space and chromaticity is considered in a weighted value of a filter convolution window.

At block S211, based on the 2D color image and structural information of each pixel in the sparse depth map, the joint bilateral filtering is performed on the image obtained after the close operation. The structural information includes color information and/or position information.

In this embodiment, the structural information of each pixel in the sparse depth map used in the joint bilateral filtering may be the color information of the pixel, may be the position information of the pixel, or may be the color information and the position information of the pixel, which is not limited herein.

At block S212, after the expansion processing, the occlusion relation between the target objects contained in the sparse depth map is changed again to obtain a dense depth map matched to the 3D point cloud data.

At block S213, if a compressing and storing operation on the dense depth map is detected, a compressed image matched to the dense depth map is generated by using a down-sampling mode, and the compressed image is stored.

In this embodiment, the down-sampling mode is used to compress the dense depth map. The sampling interval of the down-sampling mode corresponds to a decompressing operation in a step at block S214. In detail, since the expansion processing is implemented in the decompressing operation, i.e., the step at block S214, the sampling interval of the down-sampling mode should correspond to the expansion processing in the step at block S214 to ensure that the dense depth map can be accurately recover through the step at block S214.

At block S214, if a decompressing operation on the compressed image is detected, the occlusion relation between the target objects contained in the compressed image is changed and thereafter the expansion processing is performed on the compressed image, then the occlusion relation between the target objects contained in the compressed image subject to the expansion processing is changed again to obtain the dense depth map.

In this embodiment, the method of decompressing the compressed image is the same as the method of changing the sparse depth map into the dense depth map described in any embodiment, for example, the process of steps at blocks S203-S212 in this embodiment.

This embodiment provides a method for processing the 3D data. In this method, the method of changing the occlusion relation between the target objects is embodied, realizing reversing the positions of the target objects quickly, simply and accurately. The expansion processing is embodied, in which by using the diamond structure element and the square structure element to implement the expansion processing with the subrounded structure element, the smoothness of the edge in the image subject to the expansion processing is added. The close operation is added, which not only makes the contour line in the image smooth but also eliminates narrow interruptions and slender gaps, eliminates small cavities and fills up breakages in the contour line. The process of calculating an edge length of the structure element is added, which makes a combination of the diamond structure element and the square structure element similar to the subrounded structure element. Further, the process of joint bilateral filtering is added, which further improves the smoothness of each edge of the image. The process of image compression and decompression is added, which improves an effect of recovering the decompressed image to the dense depth map.

Based on the above embodiments, the expansion processing is performed on the sparse depth map as follows. The subrounded structure element with a predetermined scale parameter is constructed to perform the expansion processing on the sparse depth map.

The benefit of this embodiment is to improve the smoothness of each edge of the image subject to the expansion processing.

Third Embodiment

Figure 3:
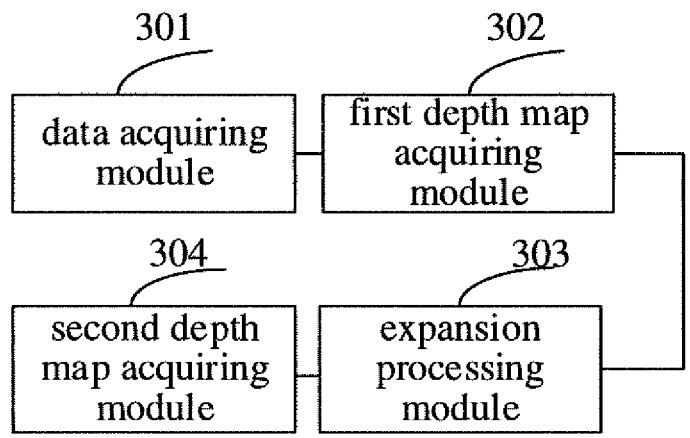
FIG. 3 is a block diagram of an apparatus for processing 3D data according to a third embodiment of the present disclosure.

FIG. 3 is a block diagram of an apparatus for processing 3D data according to the third embodiment. As illustrated in FIG. 3, the apparatus includes a data acquiring module 301, a first depth map acquiring module 302, an expansion processing module 303 and a second depth map acquiring module 304.

The data acquiring module 301 is configured to acquire 3D point cloud data to be processed. The first depth map acquiring module 302 is configured to map the 3D point cloud data into a 2D image space to obtain a sparse depth map.

The expansion processing module 303 is configured to perform an expansion processing on the sparse depth map after changing an occlusion relation between target objects contained in the sparse depth map.

The second depth map acquiring module 304 is configured to change the occlusion relation between the target objects contained in the sparse depth map subject to the expansion processing to obtain a dense depth map matched to the three-dimensional point cloud data.

The embodiments of the present disclosure provide an apparatus for processing the 3D data. The apparatus acquires through the data acquiring module 301 the three-dimensional point cloud data to be processed, maps through the first depth map acquiring module 302 the three-dimensional point cloud data into a two-dimensional image space to obtain a sparse depth map, performs through the expansion processing module 303 an expansion processing on the sparse depth map after changing an occlusion relation between target objects contained in the sparse depth map, and changes through the second depth map acquiring module 304 the occlusion relation between the target objects contained in the sparse depth map subject to the expansion processing to obtain a dense depth map matched to the three-dimensional point cloud data.

The apparatus solves the problem that it is difficult to completely and accurately show the form and position of a measured object due to the low accuracy of the 3D point cloud data obtained by one or a few 3D laser scanners, and increases the amount of 3D point cloud data reasonably and effectively, such that an accuracy of the 3D point cloud data is improved and the form and position of the measured object can be showed more completely and accurately.

Based on the above embodiment, the expansion processing module 303 may include a target pixel acquiring unit and a depth information updating unit.

The target pixel acquiring unit is configured to acquire target pixels each having a depth value contained in the sparse depth map.

The depth information updating unit is configured to replace the depth value of each target pixel with an inverse of the depth value.

Based on the above embodiment, the expansion processing module 303 may be configured to construct a sub-rounded structure element with a predetermined scale parameter to perform the expansion processing on the sparse depth map.

Based on the above embodiment, the expansion processing module 303 may include a first expansion processing unit and a second expansion processing unit.

The first expansion processing unit is configured to use a diamond structure element with a first edge length to perform a first expansion processing on the sparse depth map.

The second expansion processing unit is configured to use a first square structure element with a second edge length to perform a second expansion processing on the sparse depth map subject to the first expansion processing.

Based on the above embodiment, the expansion processing module 303 may include a third expansion processing unit.

The third expansion processing unit is configured to use a second square structure element with a third edge length to perform a closing operation on the sparse depth map subject to the second expansion processing after using the first square structure element with the second edge length to perform the second expansion processing on the sparse depth map subject to the first expansion processing.

Based on the above embodiment, the apparatus may further include a proportion calculating module and an edge determining module.

The proportion calculating module is configured to: calculate a proportion r of the target pixels to all pixels in the sparse depth map obtained by mapping the 3D point cloud data into the 2D image space, calculate a scale constant w according to the proportion r, where $$w = \sqrt{\frac{1}{r}}.$$

The edge determining module is configured to: determine the first edge length as $$\frac{\sqrt{2}}{2}w,$$

determine the second edge length as ½ w, and determine the third edge length as ½ w.

Based on the above embodiment, the apparatus may further include a 2D color image acquiring module and a joint bilateral filtering module.

The 2D color image acquiring module is configured to acquire a two-dimensional color image matched to the three-dimensional point cloud data after the close operation is performed on the sparse depth map subject to the second expansion processing using the second square structure element with the third edge length.

The joint bilateral filtering module is configured to perform a joint bilateral filtering on the sparse depth map subject to the closing operation based on the two-dimensional color image and structural information of each pixel in the sparse depth map.

The structural information comprises color information and/or position information.

Based on the above embodiment, the apparatus may further include an image compressing module and an image decompressing module.

The image compressing module is configured to, after the dense depth map matched to the 3D point cloud data is acquired, generate a compressed image matched to the dense depth map by using a down-sampling mode and storing the compressed image when detecting a compressing and storing operation on the dense depth map.

The image decompressing module is configured to, when detecting a decompressing operation on the compressed image, perform a processing on the three-dimensional data after determining the compressed image as a new sparse depth map.

The apparatus for processing the 3D data according to the embodiment of the present disclosure may be configured to execute the method for processing the 3D data, has the corresponding function modules to realize the same beneficial effect.

Fourth Embodiment

Figure 4:
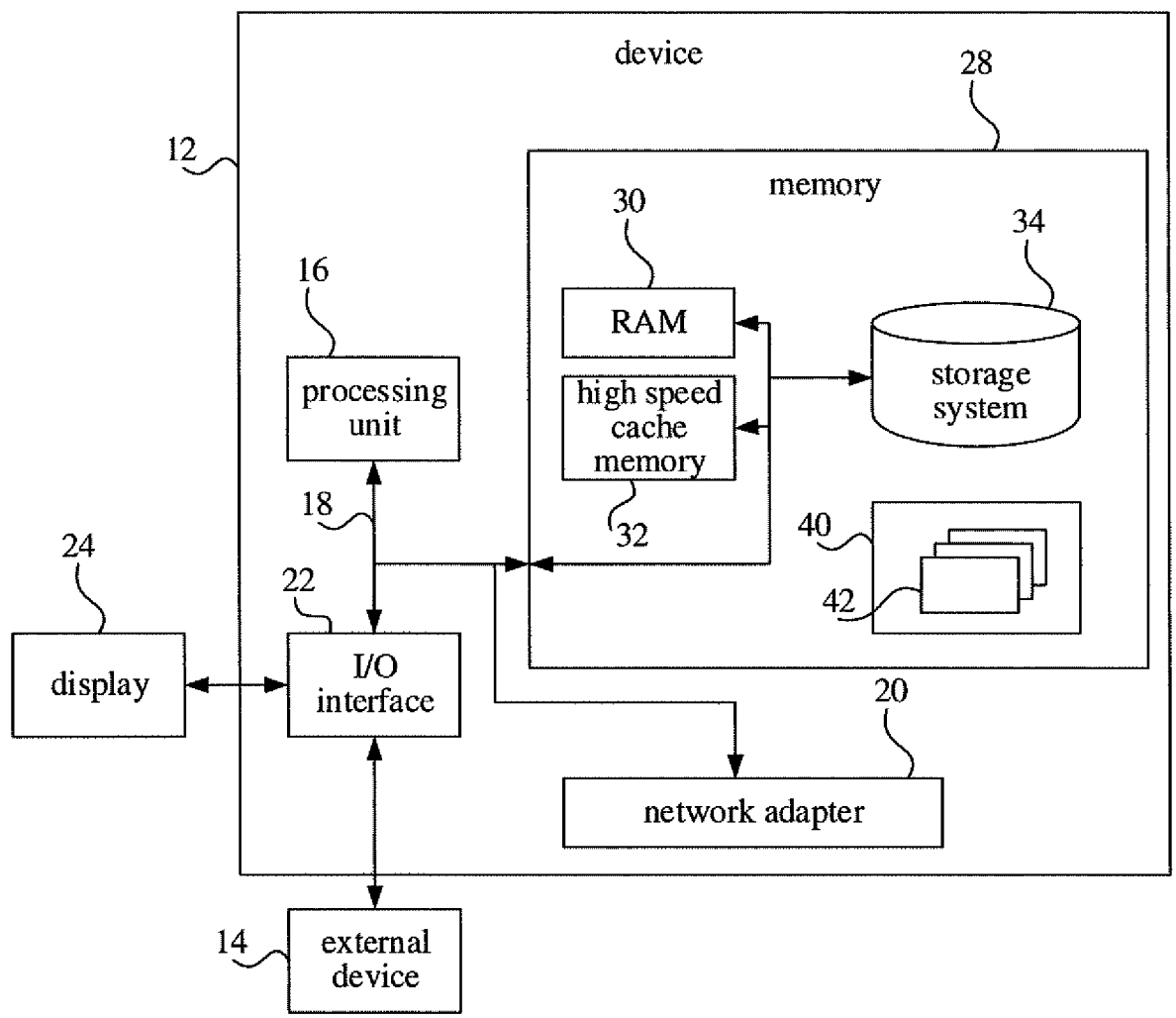
FIG. 4 is a schematic diagram of a device according to a fourth embodiment of the present disclosure.

FIG. 4 is a block diagram of a device according to the fourth embodiment of the present disclosure. FIG. 4 illustrates a block diagram of an example device 12 adapted to implement embodiments of the present disclosure. The device 12 illustrated in FIG. 4 is merely an example, and cannot be interpreted as a limitation on the function and application scope of the embodiments of the present disclosure.

As illustrated in FIG. 4, the device 12 is represented by a general computer device. Components of the device 12 may include, but is not limited to, one or more processors or processing units 16, a system memory 28, a bus 18 connected to various system components, such as the system memory 28, the processor 16.

The bus 18 represents one or more of any of several types of bus structures, including a memory bus or a memory controller, a peripheral bus, an accelerated graphics port, a processor 16, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 12 typically includes a variety of computer system readable media. These media may be any available media accessible by the device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The device 12 may further include other removable or non-removable, volatile or non-volatile computer system storage media. By way of example only, the storage device 34 may be configured to read and write a non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The device 12 may also communicate with one or more external devices 14 (such as, a keyboard, a pointing device, a display 24, etc.). Furthermore, the device 12 may also communicate with one or more devices enabling a user to interact with the device 12 and/or other devices (such as a network card, modem, etc.) enabling the device 12 to communicate with one or more computer devices. This communication can be performed via the input/output (I/O) interface 22. Also, the device 12 may communicate with one or more networks (such as a local area network (hereafter referred to as LAN), a wide area network (hereafter referred to as WAN) and/or a public network such as an Internet) through a network adapter 20. As shown in FIG. 4, the network adapter 20 communicates with other modules of the device 12 over the bus 18. It should be understood that, although not shown in FIG. 4, other hardware and/or software modules may be used in conjunction with the device 12. The hardware and/or software includes, but is not limited to, microcode, device drivers, redundant processing units, external disk drive arrays, RAID systems, tape drive and data backup storage system.

The processing unit 16 is configured to execute various functional applications and data processing by running programs stored in the system memory 28, for example, implementing the method for processing 3D data provided in embodiments of the present disclosure, the method includes: acquiring three-dimensional point cloud data to be processed; mapping the three-dimensional point cloud data into a two-dimensional image space to obtain a first depth map; performing an expansion processing on the first depth map after changing an occlusion relation between target objects contained in the first depth map; and changing the occlusion relation between the target objects contained in the first depth map subject to the expansion processing to obtain a second depth map matched to the three-dimensional point cloud data.

Fifth Embodiment

The fifth embodiment further provides a storage medium containing instructions executable by a computer. When the instructions are executed by a processor of the computer, the method for processing three-dimensional data according to any embodiment of the present disclosure is performed. The method includes: acquiring three-dimensional point cloud data to be processed; mapping the three-dimensional point cloud data into a two-dimensional image space to obtain a first depth map; performing an expansion processing on the first depth map after changing an occlusion relation between target objects contained in the first depth map; and changing the occlusion relation between the target objects contained in the first depth map subject to the expansion processing to obtain a second depth map matched to the three-dimensional point cloud data.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be noted that the above description is merely preferred embodiments and technical principles of the present disclosure. It should be understood that the present disclosure is not limited to the specific embodiments described above. Those skilled in the art may make changes, alternatives, and modifications in the embodiments without departing from spirit, principles and scope of the present disclosure. Although explanatory embodiments have been shown and described, it would be appreciated by those skilled in the art that the above embodiments cannot be construed to limit the present disclosure, and the present disclosure may further include other equivalent embodiments without departing from spirit of the present disclosure. The scope of present disclosure is determined by the accompanying claims.

What is claimed is:

1. A method for processing three-dimensional data, comprising:
   acquiring three-dimensional point cloud data to be processed;
   mapping the three-dimensional point cloud data into a two-dimensional image space to obtain a first depth map;
   changing an occlusion relation between target objects contained in the first depth map to obtain a changed depth map;
   performing an expansion processing on the changed depth map; and
   reversing the occlusion relation between the target objects contained in the changed depth map to obtain a dense depth map matched to the three-dimensional point cloud data.

2. The method of claim 1, wherein, changing the occlusion relation between the target objects contained in the first depth map comprises:
   acquiring target pixels each having a depth value contained in the first depth map; and
   replacing the depth value of each target pixel with an inverse of the depth value.

3. The method of claim 1, wherein, performing the expansion processing on the first depth map comprises:
   constructing a subrounded structure element with a predetermined scale parameter to perform the expansion processing on the changed depth map.

4. The method of claim 3, wherein, constructing the subrounded structure element with the predetermined scale parameter to perform the expansion processing on the changed depth map comprises:
   using a diamond structure element with a first edge length to perform a first expansion processing on the changed depth map; and
   using a first square structure element with a second edge length to perform a second expansion processing on the changed depth map subject to the first expansion processing.

5. The method of claim 4, wherein, after using the first square structure element with the second edge length to perform the second expansion processing on the changed depth map subject to the first expansion processing, the method further comprises:
   using a second square structure element with a third edge length to perform a closing operation on the changed depth map subject to the second expansion processing.

6. The method of claim 5, after mapping the three-dimensional point cloud data into the two-dimensional image space to obtain the first depth map, the method further comprises:
   calculating a proportion r of the target pixels to all pixels in the first depth map;
   calculating a scale constant w according to the proportion r, where $$w = \sqrt{\frac{1}{r}};$$

and
   determining the first edge length as $$\frac{\sqrt{2}}{2}w,$$

determining the second edge length as ½ w, and determining the third edge length as ½ w.

7. The method of claim 5, wherein, after using the second square structure element with the third edge length to perform the closing operation on the changed depth map subject to the second expansion processing, the method further comprises:
   acquiring a two-dimensional color image matched to the three-dimensional point cloud data; and
   performing a joint bilateral filtering on the changed depth map subject to the closing operation based on the two-dimensional color image and structural information of each pixel in the changed depth map;
   wherein the structural information comprises at least one of color information and position information.

8. The method of claim 1, wherein, after obtaining the dense depth map matched to the three-dimensional point cloud data, the method further comprises:
   when detecting a compressing and storing operation on the dense depth map, generating a compressed image matched to the dense depth map by using a down-sampling mode and storing the compressed image; and
   when detecting a decompressing operation on the compressed image, performing a processing on the three-dimensional data after determining the compressed image as a new first depth map.

9. A device comprising:
   one or more processors;
   a memory for storing one or more programs;
   wherein when the one or more programs are executed by the one or more processors, the one or more processors are caused to perform the method for processing three-dimensional data comprising:
   acquiring three-dimensional point cloud data to be processed;
   mapping the three-dimensional point cloud data into a two-dimensional image space to obtain a first depth map;
   changing an occlusion relation between target objects contained in the first depth map to obtain a changed depth map;
   performing an expansion processing on the changed depth map; and
   reversing the occlusion relation between the target objects contained in the changed depth map to obtain a dense depth map matched to the three-dimensional point cloud data.

10. The device of claim 9, wherein, changing the occlusion relation between the target objects contained in the first depth map comprises:

acquiring target pixels each having a depth value contained in the first depth map; and replacing the depth value of each target pixel with an inverse of the depth value.

11. The device of claim 9, wherein, performing the expansion processing on the changed depth map comprises:

constructing a subrounded structure element with a predetermined scale parameter to perform the expansion processing on the changed depth map.

12. The device of claim 11, wherein, constructing the subrounded structure element with the predetermined scale parameter to perform the expansion processing on the changed depth map comprises:

using a diamond structure element with a first edge length to perform a first expansion processing on the changed depth map; and using a first square structure element with a second edge length to perform a second expansion processing on the changed depth map subject to the first expansion processing.

13. The device of claim 12, wherein, after using the first square structure element with the second edge length to perform the second expansion processing on the changed depth map subject to the first expansion processing, the method further comprises:

using a second square structure element with a third edge length to perform a closing operation on the changed depth map subject to the second expansion processing.

14. The device of claim 13, after mapping the three-dimensional point cloud data into the two-dimensional image space to obtain the first depth map, the method further comprises:

calculating a proportion r of the target pixels to all pixels in the first depth map;

calculating a scale constant w according to the proportion r, where $$w = \sqrt{\frac{1}{r}};$$

and determining the first edge length as $$\frac{\sqrt{2}}{2}w,$$

determining the second edge length as ½ w, and determining the third edge length as ½ w.

15. The device of claim 13, wherein, after using the second square structure element with the third edge length to perform the closing operation on the changed depth map subject to the second expansion processing, the method further comprises:

acquiring a two-dimensional color image matched to the three-dimensional point cloud data; and performing a joint bilateral filtering on the changed depth map subject to the closing operation based on the two-dimensional color image and structural information of each pixel in the changed depth map;

wherein the structural information comprises at least one of color information and position information.

16. The device of claim 9, wherein, after obtaining the second depth map matched to the three-dimensional point cloud data, the method further comprises:

when detecting a compressing and storing operation on the dense depth map, generating a compressed image matched to the dense depth map by using a down-sampling mode and storing the compressed image; and when detecting a decompressing operation on the compressed image, performing a processing on the three-dimensional data after determining the compressed image as a new first depth map.

17. A non-transitory storage medium containing instructions executable by a computer, wherein, when the instructions are executed by a processor of the computer, the method for processing three-dimensional data comprising:

acquiring three-dimensional point cloud data to be processed;

mapping the three-dimensional point cloud data into a two-dimensional image space to obtain a first depth map;

changing an occlusion relation between target objects contained in the first depth map to obtain a changed depth map;

performing an expansion processing on the first depth map; and reversing the occlusion relation between the target objects contained in the changed depth map to obtain a dense depth map matched to the three-dimensional point cloud data.

* * * * *